United States Patent [19]
Evans

[11] 3,732,706
[45] May 15, 1973

[54] ROTARY COUPLING

[76] Inventor: Reginald Evans, 20 13th Avenue, Edenvale, Transvaal Province, Republic of South Africa

[22] Filed: July 14, 1971

[21] Appl. No.: 162,539

[30] Foreign Application Priority Data

July 20, 1970 Republic of South Africa...704971

[52] U.S. Cl.................................................64/31
[51] Int. Cl................................................F16d 3/50
[58] Field of Search.......................64/23.7, 14, 23, 64/27 HM, 31

[56] References Cited

UNITED STATES PATENTS

| | | | |
|---|---|---|---|
| 2,873,590 | 2/1959 | Croset | 64/14 |
| 1,791,763 | 2/1931 | Peters | 64/14 |
| 3,620,044 | 11/1971 | Latour | 64/14 |
| 3,621,675 | 11/1971 | Conaghan et al | 64/14 |

*Primary Examiner*—Edward G. Favors
*Attorney*—Karl W. Flocks

[57] ABSTRACT

A rotary coupling of the spacer type in which an axial space between two aligned shafts is occupied by an intermediate member generally co-axial with the shafts. Two part outer rings surround the ends of the intermediate member, one part of each ring and the ends being formed with facing recesses which together define cavities in which captive driving elements are located. The other parts of the outer rings are releasably secured to the shafts and when the ring parts are released from one another the recessed ring parts can be moved towards one another over the intermediate member to enable the recessed ring parts and the intermediate member to be removed. The driving elements can be cylindrical and of self lubricating material.

9 Claims, 4 Drawing Figures

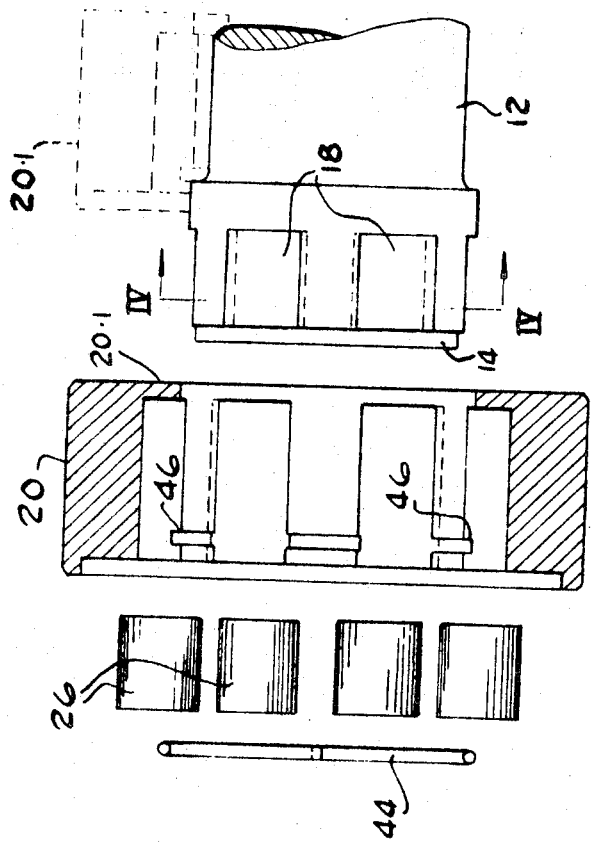
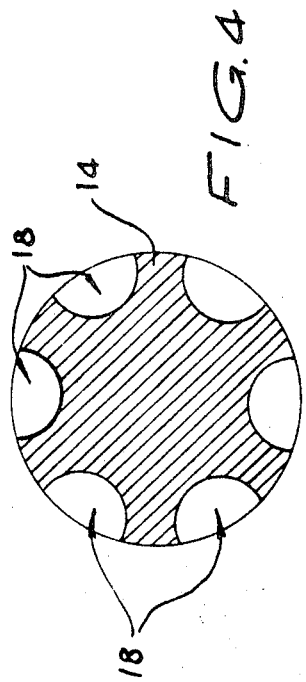
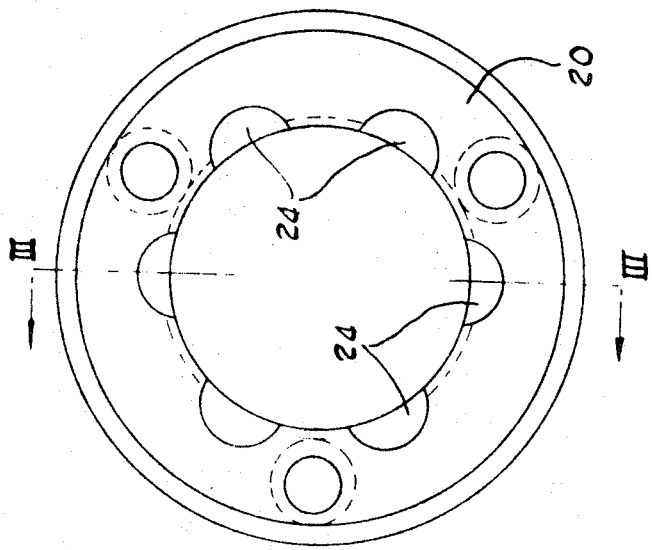
FIG. 3
FIG. 4
FIG. 2

ROTARY COUPLING

BACKGROUND OF INVENTION

This invention relates to rotary couplings.

In drive arrangements such as between a pump and a motor, the drive shaft of the motor and the driven shaft of the pump can be connected by way of a spacer-type coupling. In such arrangements an axial gap is left between the two shafts and this gap is occupied by the coupling. After removal of the coupling the shaft of the pump can be displaced axially so that the working parts of the pump or other driven device are removed from their casing. This can be done without disturbing the mounting of the pump casing.

Many types of coupling which are used as spacer couplings are full universal joints and are thus fairly complicated in construction. However, if the installation has been properly set up the two shafts should not be misaligned by more than a few thou and it should thus not be necessary to use a full universal joint.

The present invention provides a coupling which is simple in construction and in addition can readily be removed from between the two members that it connects.

SUMMARY OF INVENTION

According to the present invention there is provided a rotary coupling which includes a two part outer member and an inner member having a radial clearance space between them, said inner member and one part of the outer member each having a recess which recesses are arranged to register with each other across the clearance space thereby together defining an elongated driving element held captive in the cavity and extending across the clearance space, the other part of the outer member being adapted for connection to a driving or driven member across an axial clearance between the inner member and the driving or driven member and the two parts of the outer member being adapted for releasable connection to one another.

Preferably the driving element is cylindrical, that is, of round cross-section and can be of a non-metallic self-lubricating material.

Desirably the inner member and the driving element are free to move axially with respect to the outer member, there being stop means for limiting such axial movement, and movement of the inner member in the direction which reduces the size of said axial clearance being halted, in use of the coupling, before the inner member contacts the driven or driving member to which the outer member is connected.

In the most desirable constructional form a plurality of circumferentially spaced recesses are provided in each of the inner and outer members, and each of the cavities defined has a driving element therein. In this form the driving elements preferably have some clearance in their cavities to permit, in use, slight misalignment between the driving member and the inner member.

In the preferred constructional form the inner member is elongated in form and has an outer member encircling each end thereof with driving elements between the ends of the inner member and said outer members, said other parts of the outer members being connected to driven and driving shafts and said one parts being displaceable towards one another over the inner member once released from said other parts.

According to a further aspect of the present invention there is provided a spacer-type coupling construction comprising a driving shaft, a driven shaft generally co-axial with the driving shaft and spaced axially therefrom, and an intermediate member between the shafts, the ends of the intermediate member being encircled by two part outer members, said ends and one part of each of the outer members being formed with recesses which face one another across radial clearance spaces between said ends and said one parts of the outer members, the facing recesses defining a plurality of elongated cavities in which elongated driving elements are held captive, each of the other parts of said outer members being releasably connected to one of said shafts across axial clearance spaces between said shafts and the intermediate member and said parts of the outer members being releasably secured to one another, there being stop means for limiting axial movement of said intermediate member before contact occurs between said intermediate member and either of said shafts, said one parts of the outer members, when disconnected from said other parts, being displaceable towards one another over the intermediate member to enable said one parts and the intermediate member to be removed from between said shafts.

SHORT DESCRIPTION OF DRAWINGS

For a better understanding of the invention, and to show how the same may be carried into effect, reference will now be made, by way of example, to the accompanying drawings in which:

FIG. 2 is an end view of a ring of the spacer-type coupling,

FIG. 3 is an "exploded" side elevation of part of the spacer-type coupling with the ring sectioned along line III—III of FIG. 2, and FIG. 4 is a cross-section along line IV—IV in FIG. 3.

DETAILED DESCRIPTION OF DRAWINGS

Figure 1:
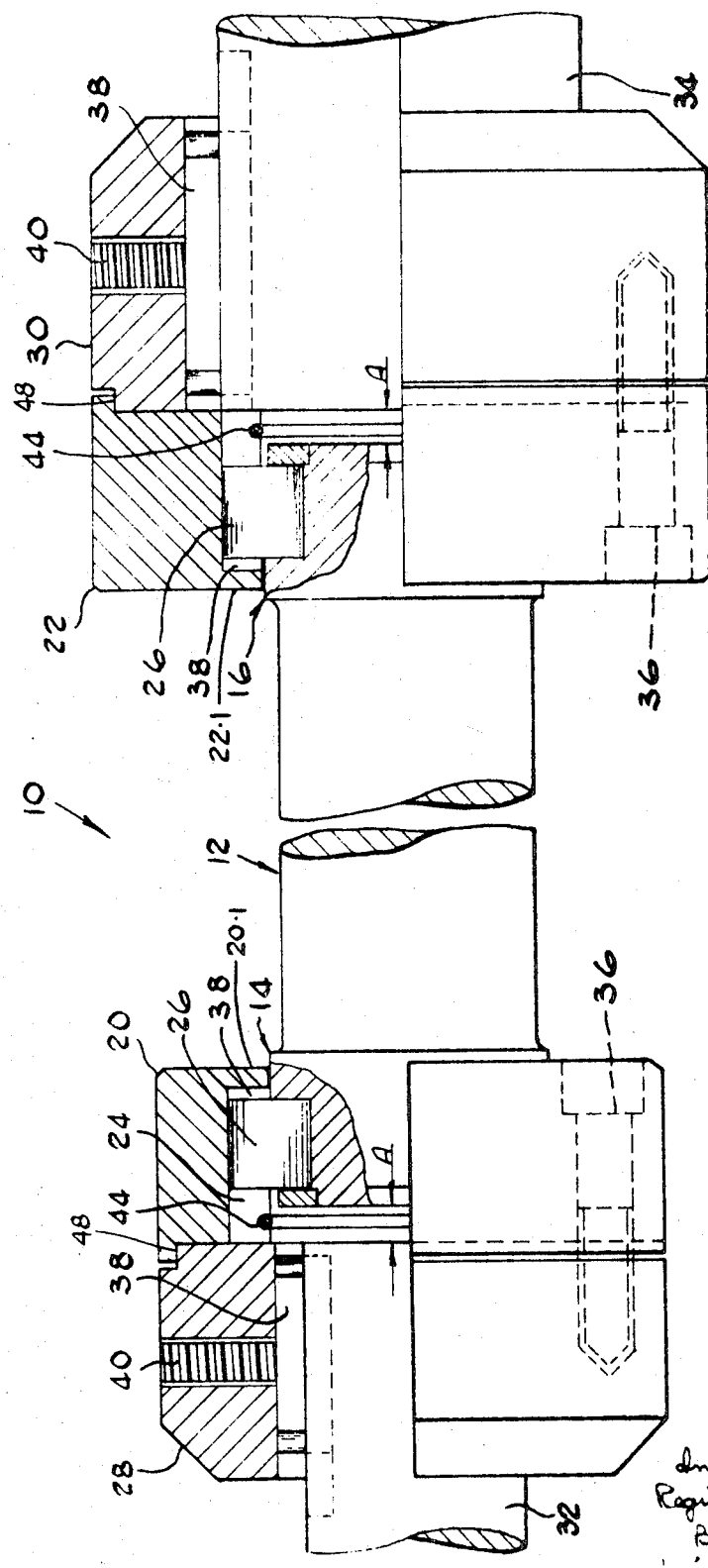
FIG. 1 is a partly sectioned side elevation of a spacer-type coupling.

Referring firstly to FIG. 1, reference numeral 10 generally indicates a spacer-type coupling which includes an intermediate member 12 having ends 14 and 16 forming the spigot portions of each of a pair of spigot and socket type joints. Each end 14 and 16 has six recesses 18 (FIG. 3) therein.

Rings 20 and 22 form the socket portions of the spigot and socket type joints. Each ring has six recesses 24 (see particularly FIG. 2) adapted to register with the recesses 18 on each of the ends of the intermediate member 12. The recesses 18 and 24 together define elongated cavities across the radial clearance spaces between the spigot and socket portions.

A plurality of elongated, cylindrical driving elements 26 are held captive in the cavities formed by the recesses 18 and 24 to permit driving engagement between the intermediate member 12 and the rings 20 and 22. The driving elements 26 extend across the radial clearance spaces. The driving elements are of a self-lubricating material such as type 66 NYLON. As illustrated, the elements 26 are of round cross section but it will be understood that they could be elliptical.

The rings 20 and 22 are connected via collars 28 and 30 to driving and driven members in the form of shafts 32 and 34. The collars 28 and 30 are releasably connected to the rings 20 and 22 by means of axially extending set screws 36 passed through the rings and threaded into the collars 28 and 30 and the collars 28 and 30 are keyed to the shafts 32 and 34 by means of keys 38 held by grub screws 40. As shown, the collar 38 has a smaller internal diameter bore than the collar 30 to permit coupling of a small diameter shaft 32 to a large diameter shaft 34. The ring 20 and collar 28 form one two-part outer member, and the other ring 22 and collar 30 form another two-part outer member.

The driving elements 26 are, in the illustrated form, cylindrical rollers, and have a degree of clearance in their cavities so as to cater for limited misalignment of the shafts 32 and 34.

The ends 14 and 16 of the intermediate member 12, the rings 20 and 22, and the driving elements 26 are so dimensioned that there is axial and radial clearance between the various parts. The only direct contact is then between the intermediate member 12 and the driving elements 26 on the one hand, and between the driving elements 26 and the rings 20 and 22 on the other hand. When the driving elements 26 are of non-metallic material (e.g. the Nylon 66 which is preferred) then no metallic contact between the driving and driven sides takes place. Axial movement of the intermediate member 12 is limited by means of stops constituted by the inwardly directed flanges 20.1 and 22.1 of the rings 20 and 22. These flanges limit movement before either of the axial gaps A between the member 12 and the shafts 32 and 34 are completely eliminated which would bring about metal-to-metal contact.

To ensure that the rings 20 and 22 and their collars 28 and 30 are accurately aligned in the axial sense, concentric mating surfaces 48 are machined on the two parts. Thus no reliance is placed on the sets screws 36 for aligning purposes.

To assemble the coupling, the rings 20 and 22 are moved over the ends 14 and 16 into the position shown dotted at 20.1 in FIG. 3 and the driving elements 26 fitted into the recesses 18 in the ends 14 and 16. The rings 20 and 22 are then returned to their in use position with the driving elements 26 held captive in each cavity formed by the registering recesses 18 and 24. Thereafter the spring clips 44 are fitted in the grooves 46 on the inner peripheries of the rings 20 and 22. The next step is to introduce the assembly into the space between the shafts 24 and 26 and then the rings 20 and 22 connected to the collars 28 and 30 by means of the set screws 38. To dismantle the coupling the above procedure is merely reversed. Movement of the rings 20 and 22 towards one another during dismantling is limited by springs clips 44. These clips are fitted into grooves in the bores of the rings 20 and 22 and contact the ends of the elements 26 when the rings 20 and 22 are moved. Thus the rings 20 and 22 cannot be moved so far as to permit the rollers to drop out of their cavities.

In use a spacer-type coupling as described in which the parts have been suitably dimensioned and suitable axial and radial clearance spaces have been provided, has a number of useful features. For example, it permits axial misalignment between the driving and driven shafts; the intermediate member 12 is fully floating and no metal contact between the intermediate member and the driving and driven members takes place. Furthermore, the drive between the shafts 24 and 26 can be disconnected by removing the intermediate member 12 without disturbing the mountings of such shafts.

The coupling described finds particular untility in arrangements where the working parts of a machine, such as a pump, are removable for servicing or repair. In such arrangements the pump and its driving motor are axially aligned with the spacer-type coupling connecting the motor output shaft to the pump input shaft. By disconnecting the coupling a gap between the two shafts is created thereby permitting the pump shaft and the working parts of the pump to be withdrawn from the pump casing without disturbing the pump mounting or the motor.

I claim:

1. A rotary spacer coupling which includes:
   a. two axially spaced ring-like outer members for coupling to driving and driven members;
   b. an inner member having opposite ends thereof entered into said spaced outer members, there being radial clearance spaces between the inner member and each outer member;
   c. radially outwardly facing recesses in each end of the inner member and radially inwardly facing recesses in the bore wall of each outer member which recesses are arranged to register with each other across the clearance spaces thereby together defining two sets of elongated cavities;
   d. elongated driving elements held captive in the cavities and extending across the radial clearance spaces, the elements being located with clearance in their cavities in such manner that the inner member is free to float end-wise with respect to the outer members; and
   e. stop means limiting float of said inner member axially with respect to said outer members.

2. A coupling according to claim 1, wherein each driving element is cylindrical, that is, of round cross-section.

3. A coupling according to claim 1, wherein each driving element is of non-metallic self-lubricating material.

4. A spacer coupling according to claim 1, in which there are two stop means each of which is constituted by a radially inwardly projecting flange of each of said outer members, said flanges co-operating with the axial ends of said elements to limit end float of said inner member in both directions.

5. A spacer coupling according to claim 4, in which:
   f. each of said outer members is in two parts;
   g. the two parts of each member are releasably secured together in axial alignment;
   h. one of said parts of each outer member is formed with said recesses;
   i. the other part of each outer member is adapted for connection to a driving or driven member, and
   j. the inner member projects into each said one part from the side opposite each said other part and terminates within said one parts.

6. A spacer coupling according to claim 5, and including further stop means for limiting movement of said one parts towards one another over the inner member after release of said one parts from said other parts.

7. A spacer coupling according to claim 6, in which the further stops are constituted by rings mounted in grooves in the bores of said one parts on the side of the elements remote from said flanges.

8. A spacer coupling according to claim 5, in which said one and other parts are machined with mating, concentric surfaces for ensuring that said one and other parts of each outer member are axially aligned.

9. A spacer-type coupling comprising;
a. a driving shaft;
b. a driven shaft generally co-axial with the driving shaft and spaced axially therefrom;
c. an intermediate member between the shafts;
d. a two part outer member encircling each end of the intermediate member, said ends and one part of each of the outer members being formed with recesses which face one another across radial clearance spaces between said ends and said one parts of the outer members, the facing recesses defining a plurality of elongated cavities;
e. an elongated driving element held captive in each of said cavities;
f. means releasably connecting each of said other parts to one of said shafts across axial clearance spaces between said shafts and the intermediate member;
g. means releasably securing said one and other parts of each outer member together, said one parts, when disconnected from said other parts, being displaceable towards one another over the intermediate member, and
h. stop means for limiting axial movement of said intermediate member before contact occurs between said intermediate member and either of said shafts.

* * * * *